United States Patent
Kelly

(10) Patent No.: US 6,864,592 B1
(45) Date of Patent: Mar. 8, 2005

(54) SEA WAVE TO ELECTRICAL ENERGY CONVERSION PLANT

(75) Inventor: Hugh-Peter Granville Kelly, Southend on Sea (GB)

(73) Assignee: Hugh-Peter Granville Kelly, Essex (GB)

( * ) Notice: Subject to any disclaimer, the term of this patent is extended or adjusted under 35 U.S.C. 154(b) by 0 days.

(21) Appl. No.: 10/031,661

(22) PCT Filed: Jul. 14, 2000

(86) PCT No.: PCT/GB00/02726

§ 371 (c)(1),
(2), (4) Date: May 16, 2002

(87) PCT Pub. No.: WO01/06119

PCT Pub. Date: Jan. 25, 2001

(30) Foreign Application Priority Data

Jul. 16, 1999 (GB) .............................. 9916779

(51) Int. Cl.⁷ .............................................. F03B 13/12
(52) U.S. Cl. ........................... 290/42; 290/53; 417/330; 60/501
(58) Field of Search ..................... 290/42, 53; 417/330, 417/331; 60/501

(56) References Cited

U.S. PATENT DOCUMENTS

| | | | | |
|---|---|---|---|---|
| 3,362,336 A | * | 1/1968 | Kafka ........................ | 417/331 |
| 3,546,473 A | * | 12/1970 | Rich ............................ | 290/42 |
| 3,696,251 A | * | 10/1972 | Last et al. .................... | 290/53 |
| 4,539,485 A | * | 9/1985 | Neuenschwander .......... | 290/53 |
| 4,594,853 A | * | 6/1986 | Raichlen et al. .............. | 60/502 |
| 5,136,173 A | * | 8/1992 | Rynne ......................... | 290/53 |
| 5,347,186 A | * | 9/1994 | Konotchick .................. | 310/17 |
| 6,020,653 A | * | 2/2000 | Woodbridge et al. ......... | 290/53 |
| 6,644,027 B1 | * | 11/2003 | Kelly .......................... | 60/498 |

FOREIGN PATENT DOCUMENTS

| | | | | |
|---|---|---|---|---|
| DE | 4338103 A1 | * | 5/1995 | .......... F03B/13/12 |
| JP | 55125364 A | * | 9/1980 | .......... F03B/13/12 |
| JP | 55160967 | * | 12/1980 | |

\* cited by examiner

*Primary Examiner*—Joseph Waks
(74) *Attorney, Agent, or Firm*—Glenn Patent Group; Michael A. Glenn

(57) ABSTRACT

Apparatus for converting the motion of sea wave energy to electrical energy includes one or more float driven linear generators, in which the inertial mass of the float and any linkage means to the linear generator is minimised. In order to generate electrical power consistently upon both the upstroke and downstroke of the float, the moving part of the generator is so sized that its gravitational weight acting upon the float, together with that of the float itself and any intermediate linkage means, is substantially equal to half the total buoyancy of the float.

7 Claims, 5 Drawing Sheets

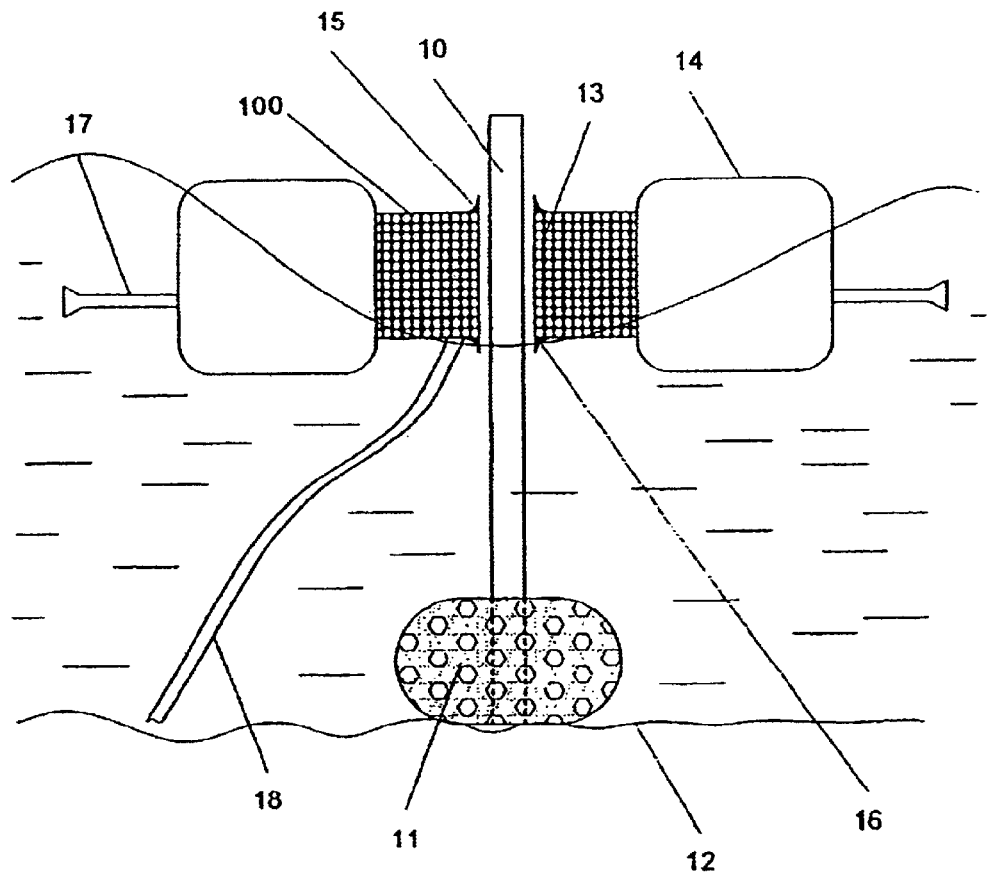
Figure 1
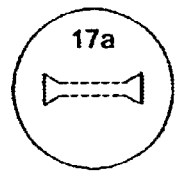

SEA WAVE TO ELECTRICAL ENERGY CONVERSION PLANT

The present invention relates to the conversion of sea wave energy to electricity.

A preferred method of obtaining electrical energy from the motion of waves is the direct conversion of wave movement to electrical power using electrical linear generators. In this arrangement, the reciprocating motion of one or more floats is used to cause relative movement between the stator and armature of such a generator. The direct generation of power is thereby realised without the need for any form of intermediary mechanism, as would be necessary for example when using rotary electrical generators.

An important factor concerning the generation of electricity from any source is the efficiency of energy conversion. This is particularly important in the case of capturing renewable energy from sea waves. Because of the high cost of installing the power conversion plant, the operator must be absolutely certain that the commercial returns will be adequate. It is not possible simply to step up output by burning more fuel, as, obviously, the behaviour of the fuel source (the sea) is outside the operator's control. Accordingly, in the case of wave power generators using linear generators as the energy conversion means, every possible watt of power must be extracted to ensure an adequate return. For this purpose, it is essential both to ensure that the apparatus is arranged to generate power as consistently as possible, and not to waste the potential energy available from sea waves on any function subsidiary to the generation of power.

An example of such a subsidiary function affecting the performance of many designs of wave conversion plant using buoyancy chambers, is the expenditure of wave energy necessary to accelerate the mass itself of the buoyancy chamber an any associated apparatus not directly concerned with the conversion of power. For example, in the case of buoyant hinged raft type constructions, which are used to generate power by employing the motion of buoyant chambers to drive hydraulic pistons, the mass of the raft buoyancy chambers themselves is considerable. As a result of this, the upthrust resulting from their buoyancy must be expended both in accelerating them in order to keep up with the speed of ascendancy of the wave acting upon them, and for driving the hydraulic piston.

The disadvantage of this arrangement is readily apparent as the following example shows. Consider a lightweight polystyrene float. This will bob up and down responsively to the action of any wave. A huge concrete block, but trapping air so as to have the same overall buoyancy, cannot possibly do the same, allowing for the basic formula p=ma. The use of the potential energy provided by the wave to lift the polystyrene float is negligible, and its resulting kinetic energy as it rides up the wave is similarly negligible. It can therefore perform the single task of conveying the potential and kinetic energy imparted to it by the wave to the power conversion means, negligible energy being lost in acting upon the float itself. This however, clearly does not apply to the concrete block. Indeed, if it is too massive, it will not have risen before the wave has fallen away.

Also, concerning the effectiveness of using linear generators to convert wave power to electricity, it is important that electrical power is generated as consistently as possible, i.e. for a given wave, as evenly as possible both over the ascent portion of the wave, and the descent portion. Thus, for this purpose, the linear generator should experience as closely as possible the same upthrust as downthrust during the ascending and descending portions of a wave.

The ideal arrangement is one in which the effects of the above described subsidiary function are minimised, and at the same time, power is generated as consistently as possible.

According to the invention wave energy to electrical power conversion apparatus comprises:

at least one linear generator having a stator and an armature which can be linearly driven relative to the stator to generate electrical energy and at least one float linked to the armature and which, in use, is immersed in the sea to be subject to the action of waves to drive the armature, the float(s), armature and link thereby constituting a wave-driven mass;

wherein the weight of the wave-driven mass is substantially equal to half the upthrust provided by the water displaced by the float(s) when fully immersed in the water.

Other, optional features of the invention, are defined in the sub-claims.

It should be noted that the invention contemplates more than one float per generator, and also where there may be more than one generator per float. In either case, the mass constraints apply to the combination of the float(s)/generator(s)/link(s) as a whole.

Thus, in this arrangement, were there to be no waves i.e. calm conditions were prevailing, on account of the fact that the combined weights equal half the buoyancy provided by the float were it to be fully submerged, the float would float half in—half out of the water (assuming it to be of a symmetrical construction). In the presence of waves, during the rise of a wave, (and assuming the mmf resistance afforded by the generators to the motion of the float is such that it is completely submerged during this rising phase), an upwards thrust is imparted to the generator equal to substantially half the weight of the water displaced by the float. Conversely, on the fall of the wave, and assuming for the same reason the float is hardly in contact with the water, a downwards thrust due to gravity is imparted to the generator equal to the combined weights of the assembly, again equal to substantially the same value as was experienced on the upstroke.

Thus the linear generators experience substantially consistent upwards and downwards thrust during the passing of a wave, and thus consistent generation of power during both of these phases is achieved. In addition, because the mass of the floats and any intermediate linkage mechanism is kept to a minimum, no energy is lost in accelerating any parasitic weight, other than the necessary mass of the moving components of the linear generators themselves, which might otherwise impede the following by the floats of the wave motion.

In other words, all of the available force arising from the presence of the float moving upon the waves, and thus the captured energy, is expended solely in the movement alone of the generators for doing useful work (setting aside the comparatively small amount of energy necessary to accelerate any intermediate linking means, and the lightweight float itself). At the same time, on account of the combined weights of the generator, float(s) and linkage means, the motion of the float is optimised for the consistent generation of power.

This is an important distinction over prior art disclosures, including linear generator wave power devices, in which conscious consideration is not given to the generation of power as consistently as possible while at the same time minimising the energy loss through the use of associated structures as light as possible.

By way of introduction to an embodiment of the invention described below, many other forms of wave energy devices cannot, by their very construction, make optimum use of the sea area available in which they operate. For example, in the case of the type of device in which buoyancy chambers are affixed to the far ends of swivelling arms for operating hydraulic pistons, the opposite ends of the arms being pivoted within a tower mounted on the sea bed containing hydraulic pistons and other components, a considerable sea area is monopolised by the arms and the tower itself. The sea area cannot therefore be used to do useful work. In an ideal world, and to obtain the maximum energy from a given area of the sea, as many floats as is possible should be operative within the waves, without of course disrupting their natural flow and thus effectiveness. It can be envisaged that a honeycomb arrangement of floats would provide an ideal solution.

Therefore, in an embodiment of the invention, the disposition, size and number of linear generators operated upon by the float/floats is such that the average horizontal area occupied by them does not exceed to any material extent the horizontal area occupied by the float(s) and any perimeter space surrounding the float for the effective operation and motion thereof. In this arrangement, the generators do not therefore occupy any space greater than that of their associated floats, and thus as many floats can be juxtaposed side by side, or in any other favourable arrangement, as is possible. Thus, for any given sized sea area, and thus size and cost of associated support structure for housing the linear generators, the maximum power may be generated and therefore the greatest financial return obtained for initial capital outlay.

In a feature of the invention, in order to enhance the captivation of wave energy, the flotation chambers are equipped with one or more paddles immersed in the sea, the planar axes of the paddles being arranged to be substantially parallel to the sea surface, the arrangement being such that the float and paddles act in combination to force movement of the armature of the generator relative to its stator, the float by means of its buoyancy, and the paddle, or paddles, by means of their resistance to the motion of the seawater. Furthermore, the planar surfaces of the paddle against which the rising and falling water presses, may be so contoured as to provide as much resistance as possible to the motion of the water, and therefore to receive the greatest counter thrust.

In a further feature of the invention, relating to the shape of the floats, their profile is optimised such as to provide the maximum possible buoyancy while offering minimal resistance to the slight elliptical horizontal movement experienced by waves as they rise and fall. Thus minimal sideways forces are communicated to any support structure supporting the linear generators. This profile may be, for example, in the shape of a 'flying saucer'.

In one embodiment of this invention, the stator of a linear motor is partially immersed in the sea, and is held perpendicular to the sea bed by a weight resting on the sea floor, or by other permanent means. The coaxial armature for traversing up and down the rod, and the generation of electricity, is directly fixed to, or is integral to, the flotation chamber—and paddles—which are also coaxial with the rod and free to travel therealong. (Note, for the purpose of clarifying the terminology used throughout this application, by armature is meant that part of the linear generator which is caused to move by the float.)

The gravitational weight of the armature, along with that of the flotation chamber is so predetermined that in use substantially half of the flotation chamber would protrude above water during calm conditions. Thus, in wave conditions, as waves ascend, its natural buoyancy raises the assembly to generate electricity, and as the waves fall, the weight of the assembly causes it likewise to fall, again generating electricity. To suit local conditions, in a feature of this embodiment of the invention, rather than using one coaxial flotation chamber per motor, one large floatation chamber may be linked by articulated joints to several generators.

In an alternative arrangement relating to this embodiment of the invention, the linear generator, or generators, rather than being immersed in the sea, is/are instead mounted within a supporting cage above sea level. The generator may be protected from sea spray and the wind by suitable cowlings. In this arrangement, the flotation chamber and paddles—moving in response to the undulation of the sea waves—are connected by push rods, or other mechanical means, to the moving part of the housed generator(s). Thus, the aggressive and inhospitable aspect of generating power from waves is confined solely to the field (ocean) replaceable flotation and paddle components. In an aspect of this form of arrangement, in order to cope with the very considerable variations in wave height arising from tidal movement affecting power plants located near the sea shore, means are provided within the cage to vary the height, relative to the sea bed, of the fixed part of the generator, in accordance with the mean height of the waves.

Referring now to an aspect of the invention concerned with how generation of electrical power is optimised for any given prevailing wave condition, control means are used to regulate the effective load impedance presented to the generators in accordance with the strength of the prevailing wave motion, the regulation being such as to ensure that the electromagnetic damping of the motion of the generators, as they generate electricity, is always such as to optimise the generation of power. By way of explanation, if the generator is either over or under damped, it will fail to respond in the optimal manner to movement of the waves, inasmuch that its frequency response will not enable sympathetic motion corresponding to that of the waves.

The invention will now be described with reference to the accompanying drawings in which:—

FIG. 1 is a schematic representation of a wave generator of the invention;

FIGS. 2a and b show the principal components of FIG. 1, including vectors showing their gravitational weights;

Referring to FIG. 1, wave energy to electrical energy conversion apparatus is depicted immersed in the sea. The apparatus comprises a float driven linear generator, the stator of which comprises a fixed rod 10, which houses a sequence of permanent magnets. The rod is embedded, at its lowest extremity, in a concrete block, 11. The block itself is anchored to the sea bed—shown generally at 12- to avoid drifting.

Figures 2A, 2B:
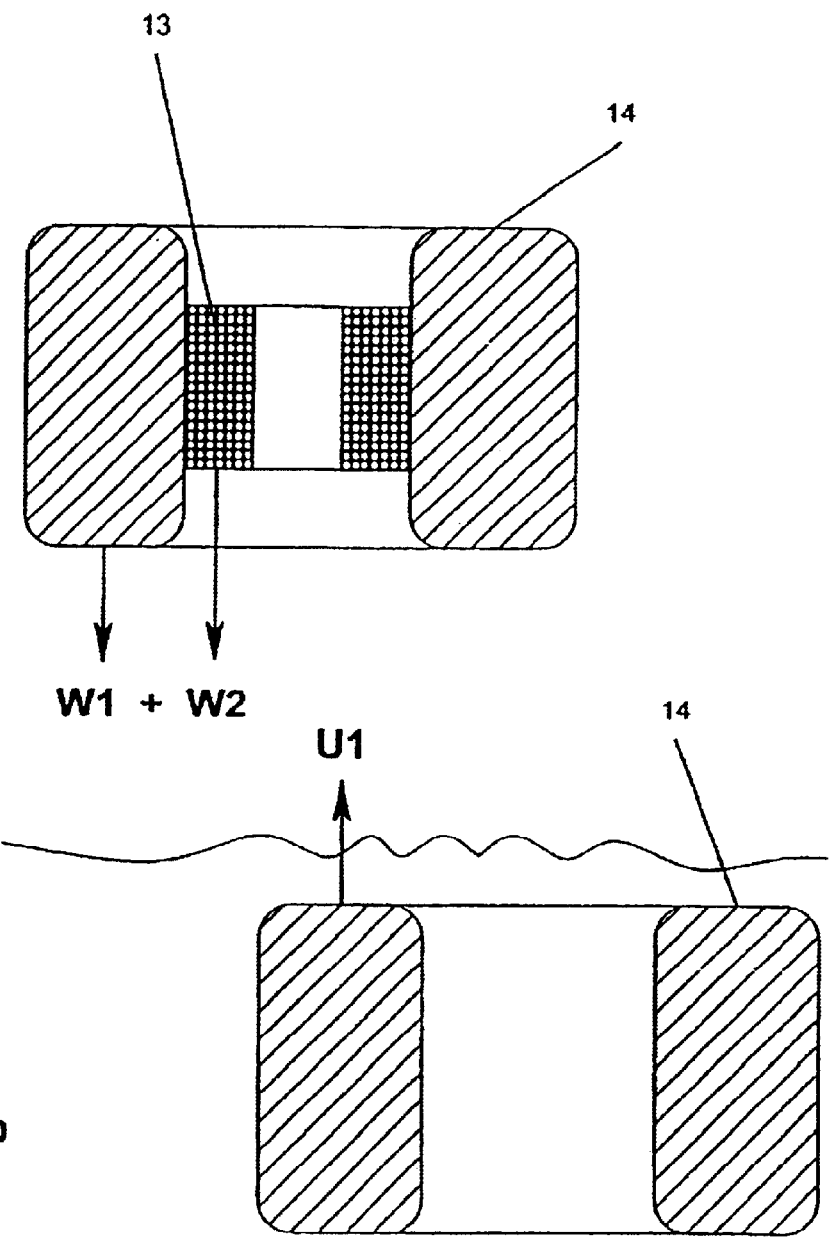

The armature of the generator 13 comprises a cylindrical housing in which is embedded a series of coils. Coaxially surrounding the armature, and affixed thereto, is an annular flotation chamber 14; the fixture of the chamber 14 to the armature, at 100, constitutes a link by means of which motion of the chamber 14 drives the armature. The float is made of a construction which is as light as possible. This is in order to ensure that its weight is negligible in comparison with that of the armature of the generator, and therefore that the wave energy present is expended usefully on generating electrical power rather than accelerating any undue mass of the float itself, and/or restricting the assembly from following the wave motion. Located at the upper and lower surfaces of the armature are bearing bocks 15 and 16, for guiding the armature coaxially up and down the stator. Annular paddles 17, are also affixed to the flotation chamber. The paddles are contoured in order to offer as much resistance as possible to vertical movements of the sea water, see inset diagram at 17a. The size and/or length of the armature of the linear generator, and thus its weight, is so selected that its weight, combined with that of the float, is such as to counteract by half the total upthrust afforded by the volume of water that would be displaced by the float were the float to be submerged. This is shown more clearly with reference to FIGS. 2a and B. The weight W1 of the linear generator armature 13, combined with the weight W2 of the float 14, i.e. W1+W2, is arranged to equal substantially half the upthrust U1 of water displaced by the float were it to be fully submerged.

The action of the apparatus is as follows. As a wave arrives, the natural buoyancy of the flotation chamber causes the whole assembly to rise. This is assisted by the pressure of the rising water acting against the paddles 17. Thus relative motion arises between the armature and stator of the linear generator and alternating current is generated within the coils of the generator, the amplitude and frequency of which depend upon the vigour of the wave motion. The current is conducted to a shore station by a suitably armoured flexible cable, 18. (Note, means, not shown, are present to prevent rotation of the assembly and therefore unwanted tensioning of the cable.)

Once the wave has reached its zenith, and begins to fall, the weight of the assembly causes the same also to fall. Power again is generated as the armature traverses the stator. Because the upthrust experienced by the generator is substantially the same as the weight of the assembly, electricity is generated reasonably consistently both upon the rise and fall phases of the wave. There is some natural phase lag between the ascending of the assembly relative to the waves, and its fall, due to the natural damping effect of the electromotive force generated. As will be hereinafter described in more detail, the load impedance presented to the generator, and the overall weight of the moving assembly, is so selected as to optimise generation for any particular wave condition.

The apparatus of the invention thereby generates electrical energy consistently by the simple expedient of using an elongate linear motor having an armature of appropriate weight acting in reverse as a wave powered linear generator. In addition, owing to the lightweight construction of the float itself, the available sea wave energy is expended in causing the relative motion of the generator armature to its stator, rather than being expended also on the mass of the float itself.

Figure 3:
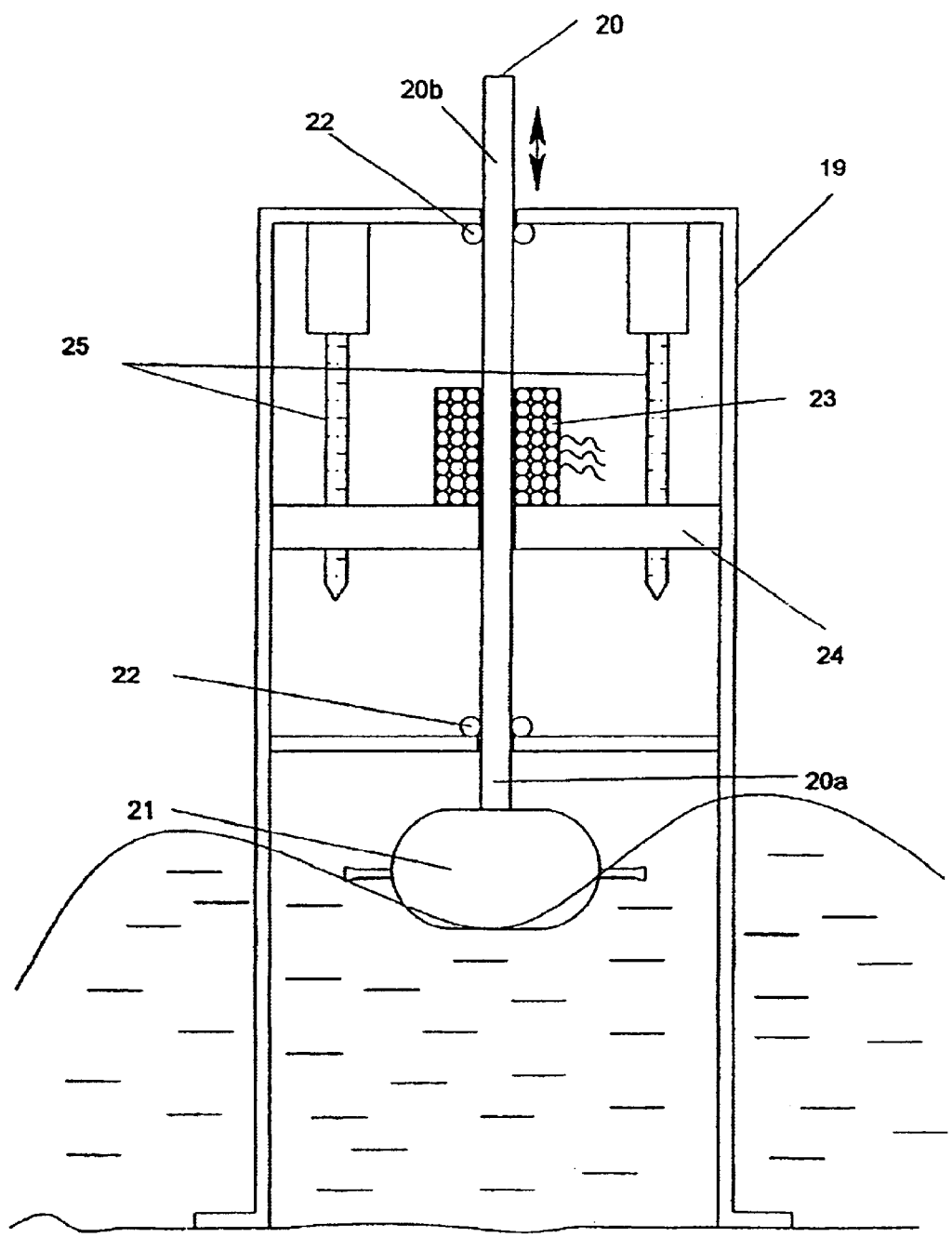
FIG. 3 shows an arrangement in which the generators are mounted above sea level in a cage.

As an alternative to the immersing of the generator in the sea, and/or when generation is to be effected at a sea depth where it is impractical to use the arrangements of FIG. 1, an alternative method of mounting the generator may be employed with many practical advantages. Referring to FIG. 3, rather than the generator being immersed in the sea, it is instead mounted within a cage 19, which in this illustration, itself rests on and is anchored to the sea bed. (Alternatively, in the case of operation in deep waters, the cage may be supported on the sea surface by separate buoyancy chambers, and moored by anchor to the sea bed.) In this arrangement, the moving part of the generator is the armature 20. (Note, for the purpose of clarifying the terminology used throughout this application, by armature is meant that part of the linear generator which is caused to move by the float.) For the purpose of economy of construction, not all of the armature contains permanent magnets. On the contrary, the armature tube is only filled with magnets in the vertical active central portion thereof which, in normal use, traverses past the stator. The portion 20a and 20b which extend respectively downwards to the float 21, and upwards through the guide rollers 22, are instead filled with a material of appropriate durability and structural strength. As can be seen from the figure, the stator 23, is mounted on a platform 24, within the cage. As the float and paddle combination 21 is caused to ascend/descend by the undulation of the waves, so the armature is moved through the fixed stator to generate power. The armature is guided both above and below the stator by the rollers, 22. Both the float and the portions 20a and 20b of the armature rod 20, are made of material of as light weight as possible, commensurate with adequate structural strength, to ensure that the available sea energy is expended on useful generation. The portion 20a of the armature may be considered a link which mechanically connects the float 21 to the generative part of the armature 20 in the region of the stator 23.

As is well known, there can be significant variations of the height of the sea close by the sea shore due to tidal motion. Thus, according to the time of day, the height of the peaks and troughs of any 'given size' wave may vary substantially relative to the sea bed. This must be accommodated in the case of near shore location of any of the arrangements herein disclosed, by the use of a sufficiently long armature rod. However, filling an extended rod along its whole length with magnetic material, so that an 'active portion' is always presented to the stator, entails undue expense. To cope with this situation, the stator may be situated on the vertical movable platform 24. The height of the platform may be adjusted by detection means, (not shown), to vary with the mean height of the waves, i.e. the average tidal level, by lead screw actuators, 25. The stator may be cooled by sea water pumped around a cooling jacket surrounding the same.

Figure 4:
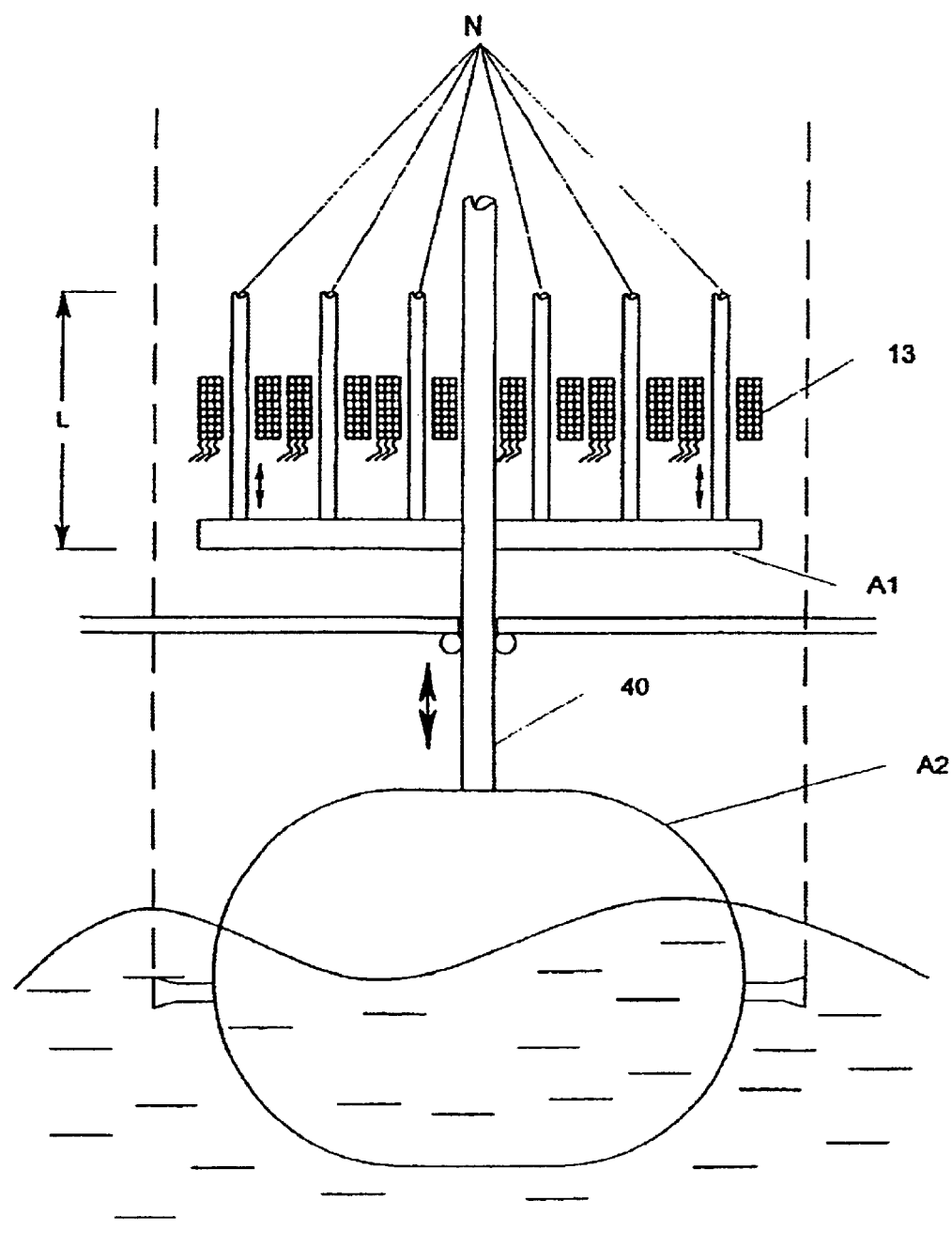
FIG. 4 shows a multiplicity of generators mounted above and within the confines of the horizontal surface area of a float.

Referring to FIG. 4, a balance is achieved between the length L of the linear generators 13 and the total number N used for any given float, such that, while achieving the necessary mmf resistive force, the total horizontal area A1 occupied by them falls within the equivalent horizontal area A2 occupied by the float, as shown. By this means, floats can be closely juxtaposed in order to make optimum use of the sea area in which they are immersed, and thus achieve the largest possible conversion of sea wave energy to electrical energy for a given area. This additionally provides the maximum return in terms of revenue for each kilowatt hour generated, for a given capital outlay on support structures.

Figure 5:
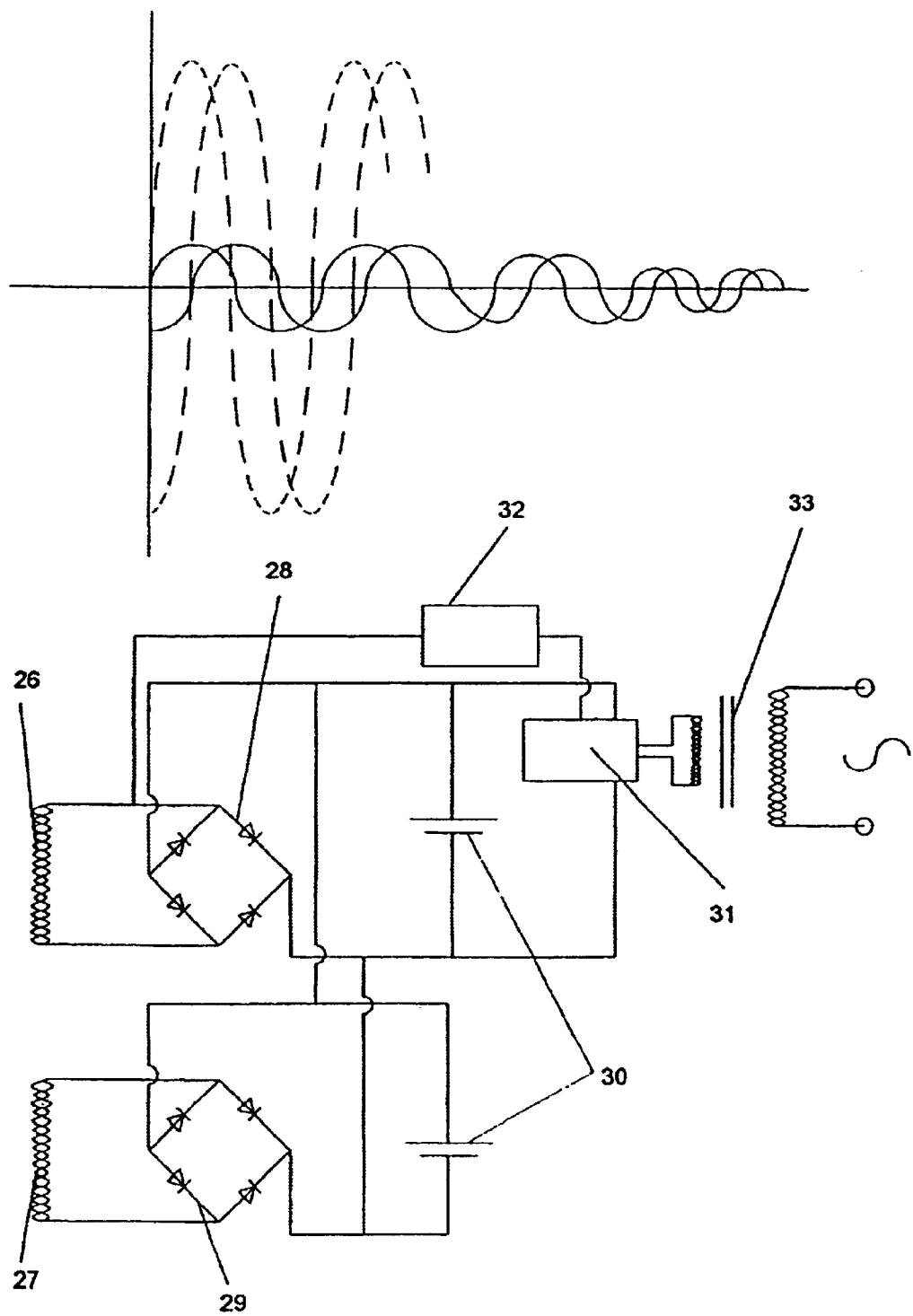
FIG. 5 shows typical electrical current waveforms generated by the wave movement, and control circuitry for optimising the use of the available wave power in any set of prevailing conditions.

For any given sea condition, which may vary from a light swell to a raging storm, it is important to ensure that the moving part of the generator faithfully follows the movement of the waves. For example, should the armature be feeding a short circuit, its motion would be excessively damped, and the float/paddle combination would be unable to follow the waves in an optimal fashion. Similarly, in a storm, were the generator to be feeding effectively an open circuit, the assembly may rise too easily in response to an approaching wave, and, under its own momentum, overshoot the crest thereof. Therefore means are necessary to ensure the load impedance is suitably adjusted for any given wave pattern. Referring to FIG. 5, AC currents generated within the coils of the generator, shown symbolically by way of example at 26 and 27, are first rectified by bridge rectifiers 28 and 29. The resulting DC currents are then fed into storage means 30. The storage means assists both in producing a steady DC level, and for ensuring a constant supply of energy whether a storm is present or an intervening calm. An inverter 31, is used, via a transformer 33, to supply alternating current to the electricity distribution system. The effective impedance of the inverter is dynamically adjusted by detection means 32 which itself is responsive to the form of current the generators are attempting to generate, in order to optimise generation of power for any prevailing wave condition. Thus the criteria outlined above for ensuring optimal matching of the generating capacity of the generator, with that of the motion of the waves, is permanently self-optimised. Other control circuitry means, (not shown), are used—as is customary in generating stations—to ensure the phase angle of the generated currents is correct for the addition of power to the distribution system.

An additional feature of the invention, which indeed can be applied to all the arrangements described herein, is that the permanent magnets within the rod of the generator may, according to their position along the rod, be made of permanent magnetic materials of varying field strengths and therefore cost, such that at the middle of the stator, where motion of the armature will be at its greatest, are located the strongest magnets, and at the extremities of the rod, weaker magnets. This arrangement can thereby also be used to match the predominant wave conditions, as well as economising in the cost of magnets used.

Numerous variations of the above will be apparent to those skilled in the art.

What is claimed is:

1. An apparatus of wave energy to electrical energy power conversion comprising:
   at least one linear generator having a stator and an armature which can be linearly driven relative to the stator to generate electrical energy and at least one float linked to the armature by link means and which, in use, is immersed in the sea to be subject to the action of waves to drive the armature, the at least one float, the link means and the armature thereby constituting a wave-driven mass;
   wherein the weight of the wave-driven mass is substantially equal to half the upthrust provided by the water displaced by the at least one float(s) when fully immersed in the water, and wherein the contribution to the weight of the wave driven mass of the at least one float and the link means is negligible compared with that of the armature; and
   further comprising control means used to regulate the effective load impedance presented to the generator or generators in accordance with the strength of the prevailing wave motion acting upon the at least one float, the regulation being such as to ensure that the electromagnetic damping of the motion of the armature of the or each generator as it generates electricity, is always such as to optimise the generation of power.

2. The apparatus of claim 1, wherein the average horizontal area occupied by the at least one linear generators does not exceed to any material extent the horizontal area occupied by the at least one float and any perimeter space surrounding the at least one float for the effective operation and motion thereof.

3. The apparatus of claim 1, wherein the at least one float is equipped with one or more paddles, suitably contoured, to augment the force of the sea waves acting upon the at least one float.

4. The apparatus of claim 1, wherein the at least one float is so contoured as to minimise any wave latent forces acting upon it, while maximising its buoyancy.

5. The apparatus of claim 1, wherein the stator of the at least one linear generator is maintained stationary and substantially perpendicular to the sea bed, and the armature thereof is affixed directly to the at least one float for traversing the stator in accordance with the motion of the waves acting upon the at least one float.

6. The apparatus of claim 1, wherein the stator of the at least one linear generator is held in a cage above sea level.

7. The apparatus of claim 6, wherein the link to the float is a direct extension of the armature of the at least one generator.

* * * * *